US008964966B2

(12) United States Patent
Michaelis (10) Patent No.: US 8,964,966 B2
(45) Date of Patent: Feb. 24, 2015

(54) MULTI-MICROPHONE SYSTEM TO SUPPORT BANDPASS FILTERING FOR ANALOG-TO-DIGITAL CONVERSIONS AT DIFFERENT DATA RATES

(75) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 895 days.

(21) Appl. No.: 12/882,929

(22) Filed: Sep. 15, 2010

(65) Prior Publication Data

US 2012/0063587 A1 Mar. 15, 2012

(51) Int. Cl.
H04M 1/00 (2006.01)
H04M 9/00 (2006.01)
H04M 1/253 (2006.01)
H04R 3/00 (2006.01)
H04M 11/06 (2006.01)

(52) U.S. Cl.
CPC .............. H04M 1/253 (2013.01); H04R 3/005 (2013.01); H04M 11/066 (2013.01)
USPC .............. 379/399.02; 379/93.08; 379/387.02; 379/422

(58) Field of Classification Search
USPC ......... 379/387.01–397, 93.06, 93.08, 399.02, 379/422
See application file for complete search history.

(56) References Cited

U.S. PATENT DOCUMENTS

| | | | |
|---|---|---|---|
| 8,744,087 B2 * | 6/2014 | Bodley et al. ................... | 381/10 |
| 2003/0224815 A1 * | 12/2003 | Rodman et al. ............... | 455/517 |
| 2005/0108009 A1 * | 5/2005 | Lee et al. ...................... | 704/229 |
| 2005/0207566 A1 * | 9/2005 | Ohki et al. ............... | 379/406.01 |
| 2006/0029086 A1 | 2/2006 | Akie et al. | |
| 2006/0142070 A1 * | 6/2006 | Park ........................... | 455/569.1 |
| 2008/0130913 A1 * | 6/2008 | Kong et al. .................... | 381/92 |
| 2008/0252595 A1 * | 10/2008 | Boillot ........................... | 345/156 |
| 2009/0310520 A1 | 12/2009 | Yang et al. | |

FOREIGN PATENT DOCUMENTS

WO WO 2011/001012 1/2011

OTHER PUBLICATIONS

Official Action with English Translation for German Patent Application No. 102011112849.6, dated Mar. 20, 2014, 10 pages.
Official Action for U.S. Appl. No. 13/764,170, mailed Sep. 12, 2014, 5 pages.
Official Action for U.S. Appl. No. 13/764,170, mailed Dec. 23, 2014 8 pages.

* cited by examiner

Primary Examiner — Alexander Jamal
(74) Attorney, Agent, or Firm — Sheridan Ross P.C.

(57) ABSTRACT

One exemplary problem addressed by the techniques disclosed herein is that the A-to-D converter of the broad-band audio codec that is being used more frequently in IP telephony, G.722, samples the analog audio source 16,000 times per second, rather than 8,000. Since all G.722-capable telephones must continue to be G.711-capable, one problem is that a microphone that provides appropriate bandpass filtering for G.722 encoding fails to provide adequate filtering for G.711. One exemplary aspect is therefore directed to telephones that must be able to switch back and forth between narrow-band digital audio encoding in which the A-to-D converter samples the audio stream 8,000 times per second, and a wide-band audio encoding in which the A-to-D converter samples the audio stream 16,000 times per second. This is accomplished using one or more of a plurality of switched microphones, a filter and a modification of the resonant frequencies of a handset.

20 Claims, 3 Drawing Sheets

MULTI-MICROPHONE SYSTEM TO SUPPORT BANDPASS FILTERING FOR ANALOG-TO-DIGITAL CONVERSIONS AT DIFFERENT DATA RATES

FIELD

An exemplary aspect is directed toward communications hardware. More specifically, an exemplary aspect is directed toward enabling bandpass filtering in devices that must support more than one A-to-D conversion rate by equipping the devices with separate microphones that are physically optimized for their different rates.

BACKGROUND

If one wished to digitize an analog audio signal in which all of the important acoustic information is below 4,000 Hz (hertz), the basic steps of the analog-to-digital conversion would include the following:

Filter from the original signal all information about 4,000 Hz,

Divide the filtered signal into 8,000 segments per second, and

Go through the segments in order, measuring and recording the average amplitude of the signal within each segment.

The purpose of the first step is to prevent "aliasing"—the creation of false artifacts caused by the undesired interaction of the sampling rate with frequency of the observed events. This phenomenon can be readily observed in motion pictures where the spokes of a rapidly rotating wheel may appear to be standing still or even moving backwards.

In most telephones that transmit information digitally, the "bandpass filtering"—i.e., the removal of acoustic signals that have a frequency more than half that of the A-to-D sampling rate—is commonly achieved inexpensively, without reliance on special-purpose electronic circuits or digital signal processing, by using a microphone that is physically incapable of capturing an audio signal above the desired cut-off. This microphone-limited approach has been satisfactory for many years because the commonly used digital telephone encoding techniques, such as G.711 and G.729, have the same 8,000 samples-per-second sampling rate.

G.711 is an ITU-T standard for audio companding. It is primarily used in telephony. The standard was released for usage in 1972, and its formal name is Pulse Code Modulation (PCM) of voice frequencies. It is a required standard in many technologies, for example in H.320 and H.323 specifications. It can be also used as a method for fax communication over IP networks (as defined in T.38 specification). G.711 represents logarithmic pulse-code modulation (PCM) samples for signals of voice frequencies, sampled at the rate of 8000 samples/second. G.711.0 (G.711 LLC)—Lossless compression of G.711 pulse code modulation was approved by the ITU-T in September 2009 and it gives as much as 50 percent reduction in bandwidth use. G.711.1 is an extension to G.711, published as ITU-T Recommendation G.711.1 in March 2008 and its formal name is Wideband embedded extension for G.711 pulse code modulation. G.711, also known as Pulse Code Modulation (PCM), is a very commonly used waveform codec. G.711 uses a sampling rate of 8,000 samples per second, with the tolerance on that rate 50 parts per million (ppm). Non-uniform quantization (logarithmic) with 8 bits is used to represent each sample, resulting in a 64 kbit/s bit rate. There are two slightly different versions; μ-law, which is used primarily in North America, and A-law, which is in use in most other countries outside North America.

A problem with speech digitization techniques that have an upper frequency limit of 4,000 Hz, such as G.711, is that many components of human speech that are important for intelligibility—for example, the acoustic information that allows "f" and "s" sounds to be distinguished from each other—are at frequencies above 4,000 Hz. Despite that, a reason why coders such as G.711 continue to be used is that 4,000 Hz is the upper frequency limit of the analog Public Switched Telephone Network (PSTN). There is no benefit to encoding acoustic information above 4,000 Hz if the call is to be carried by a network that is unable to transmit those frequencies.

With the advent of Voice over Internet Protocol telephony, calls from one digital endpoint to another no longer need to be constrained by the upper frequency limits of the analog PSTN.

G.722 is an ITU-T standard 7 kHz wideband speech codec operating at 48, 56 and 64 kbits/s. It was approved by ITU-T in November 1988 and the technology in the codec is based on sub-band ADPCM (SB-ADPCM). G.722 samples audio data at a rate of 16 kHz (using 14 bits), double that of traditional telephony interfaces, which results in superior audio quality and clarity. Other ITU-T 7 kHz wideband codecs include G.722.1 and G.722.2. These codecs are not variants of G.722 and they use different patented compression technologies. G.722.1 is based on Siren codecs and offers lower bit-rate compressions. A more recent G.722.2, also known as AMR-WB ("Adaptive Multirate Wideband") is based on ACELP and offers even lower bit-rate compressions, as well as the ability to quickly adapt to varying compressions as the network topography mutates. In the latter case, bandwidth is automatically conserved when network congestion is high. When congestion returns to a normal level, a lower-compression, higher-quality bitrate can be restored.

SUMMARY

One exemplary problem addressed by the techniques disclosed herein is that the A-to-D converter of the broad-band audio codec that is being used more frequently in IP telephony, G.722, samples the analog audio source 16,000 times per second, rather than 8,000. Keeping in mind that all G.722-capable telephones must continue to be G.711-capable (to ensure interoperability with phones that do not support G.722), the problem is that a microphone that provides appropriate bandpass filtering for G.722 encoding fails to provide adequate filtering for G.711.

When operated in a G.711 mode, G.722-capable telephones sample the audio source 16,000 times per second and then rely on software processing to down-convert the signal to an 8,000 sample-per-second representation with an upper acoustic limit below 4,000 Hz.

Because the 16,000 sample-per-second rate is exactly twice that required for an 8,000 sample-per-second representation, it is tempting to assume that the amplitude samples that are required for G.711 encoding can be obtained by sampling 16,000 times-per-second and then using every other sample. For example, all even-number samples would be retained and all odd-number samples would be deleted, which each retained sample representing $1/8,000$ of a second of data instead of $1/16,000$.

To illustrate one exemplary reason why this won't work, keep in mind that the output of a G.711 coder should be zero if one attempts to encode an acoustic frequency above 4,000 Hz. Now envision what a 16,000 sample-per-second A-to-D converter would create as the amplitude value for each sample if the input is a pure tone of 5,000 Hz. Because a 16,000 sample-per-second A-to-D converter is able to encode a 5,000 Hz tone accurately, most of the samples from this conversion will have a non-zero amplitude. For this reason, using the samples in the manner described above to create an 8,000 sample-per-second representation of a 5,000 Hz tone would not yield the desire to zero-amplitude output, but would instead produce an excellent example of audio distortion due to aliasing.

While there are software techniques that can down-sample in a reliable manner, software down-sampling is not computationally simple, nor an inexpensive task.

One exemplary aspect is therefore directed to telephones that must be able to switch back and forth between narrow-band digital audio encoding in which the A-to-D converter samples the audio stream 8,000 times per second, and a wide-band audio encoding in which the A-to-D converter samples the audio stream 16,000 times per second.

Keeping in mind that these two A-to-D converters require different levels of bandpass filtering in order to prevent aliasing, one exemplary aspect is directed toward utilizing two or more different microphones to provide the filtering. The physical characteristics of the first microphone would be configured to prevent the microphone from being able to capture sounds above 4,000 Hz. The physically characteristics of the second microphone would prevent the microphone from being able to capture sounds above 8,000 Hz. In this exemplary scenario, input from the first microphone would be used for the input for narrow-band encoding and the input from the second microphone used as input for wide-band encoding.

Examples of where the dual microphone approach could be implemented include telephone handsets, telephone headsets, and microphone modules of speakerphones. One extension to this basic idea is that if more than two different data rates must be accommodated, more than two different microphones may be employed as needed.

An interesting aspect of one of the exemplary techniques is that a potential benefit with regard to the reduction of computational complexity can be seen by revisiting the above scenario. In the above scenario, if one were to bandpass-filter the input signal to remove all frequencies above 4,000 Hz prior to doing the 16,000 samples-per-second A-to-D conversion, the computationally simple use of every other sample to create an 8,000 sample-per-second digital representation would work perfectly.

Accordingly, an exemplary aspect is directed toward providing bandpass filtering in devices that must support more than one A-to-D conversion rate by equipping the device with one or more microphones that are physically optimized for the different rate(s).

Additional aspects are directed toward a detection and subsequence selection of an appropriate microphone based on a data rate.

Even further aspects are directed toward selecting one microphone from a plurality of microphones in a phone handset, based on information in a handshake or SIP handshake.

Even further aspects are directed toward providing a switch that allows manual selection of one of the microphones to support a specific data rate.

In accordance with yet another exemplary embodiment, a single microphone could be provided and equipped with appropriate mechanical filtering mechanisms that can be, for example, user or automatically actuated, the mechanical filtering mechanism providing variable bandpass filtering.

Even further aspects of the invention are directed toward one or more of handset, speaker phone, cell phone, soft phone, smartphone, or in general any communications device with an audio transducer that feeds different audio converters with different sampling rate audio information, the devices equipped with one or more microphones, the microphones select to correspond to a supported data rate.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state memory like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some exemplary aspects. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with reference to the following figures, wherein.

DETAILED DESCRIPTION

The various embodiments and configurations in this disclosure will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any application in which it is desirable to collect and associate related and temporally changing multimedia information for presentation to a user.

Figure 1:
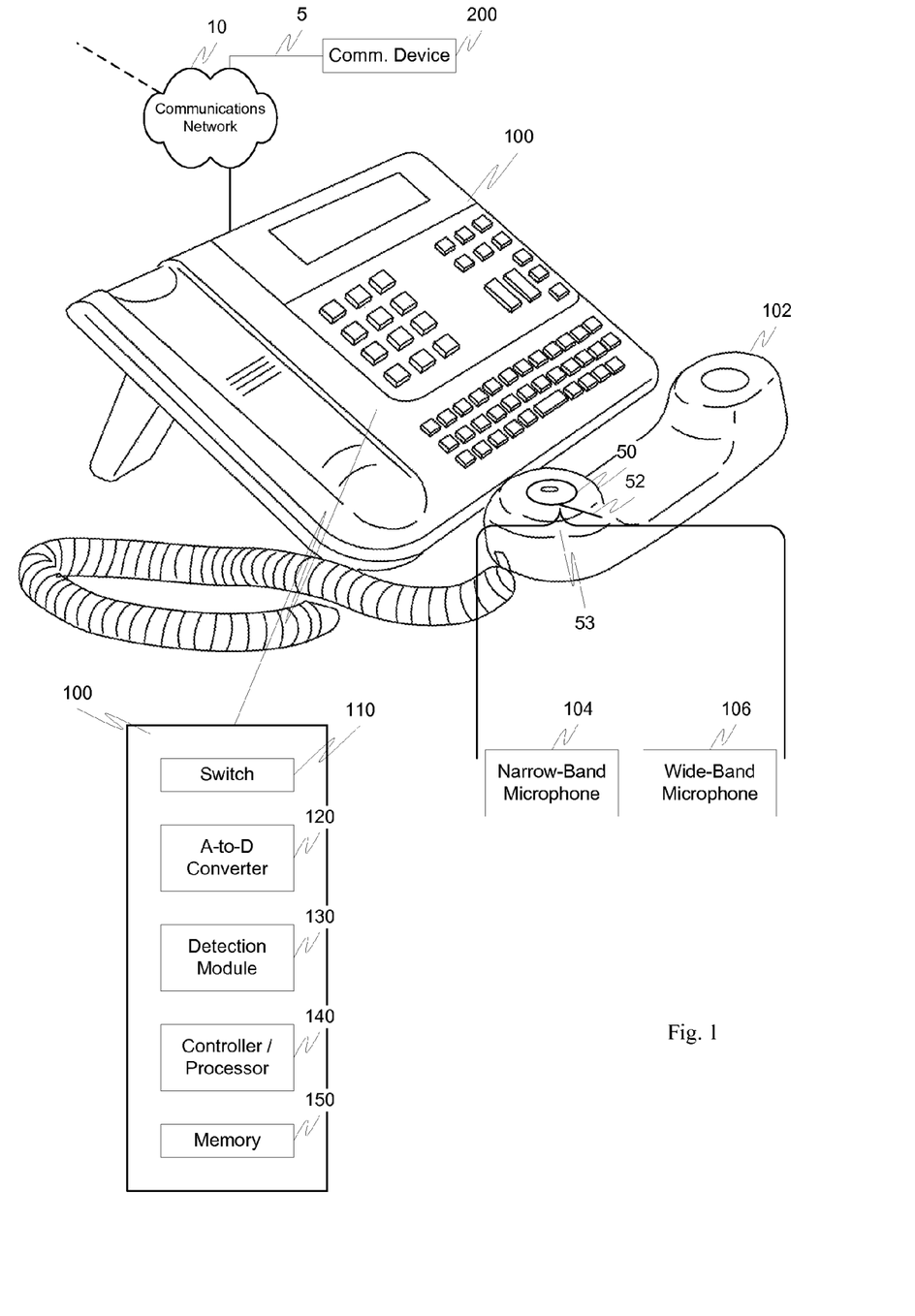
FIG. 1 illustrates an exemplary communications device.

Accordingly, an exemplary communications system comprises a plurality of communication devices, each associated with one or more users. In the example of FIG. 1, a first communication device 100 can be associated with a first user and comprises an enterprise phone type device. The communication device 100 can be any device capable of supporting communications established in connection with a communication network.

The communication network (not shown) interconnecting the communication device(s) may comprise any type and any number of communication mediums capable of supporting communications sessions, such as voice calls, video calls, chats, emails, TTY calls, multimedia sessions, or the like. The communication network may include a LAN, a WAN, a SIP network, and any other type of packet-switched and/or circuit-switched network known in the art. In addition, it can be appreciated that the communication network need not be limited to any one network type, and instead may be comprised of a number of different networks and/or network types. The communication network may include an IP multimedia subsystem (IMS) network, an architectural SIP standard well known in the art, or any other type of network that provides access to one or more of the Internet, a standard plain old telephone system (POTS), an integrated services digital network (ISDN), the public switched telephony network (PSTN), and/or any type of known cellular or other wireless communication network. Moreover, the communication network may be linked to the Internet. Accordingly, the communication network is equipped to facilitate and support communications between one or more communication devices via one or more communication media and/or modalities.

Also available via the communications network is a server computer (not shown). Although not required, the inclusion of a server computer can allow some or all functions performed in support of a communications session between communication devices to be performed by or in connection with the server computer.

Each communication device 100 may include a processor capable of executing program instructions or software. Accordingly, the processor may include any general purpose programmable processor or controller for executing application programming or instructions. As a further example, the processor may comprise a specially configured application specific integrated circuit (ASIC). The processor generally functions to run programming code or instructions implementing various of the functions performed by the communication device. As will be appreciated, such functions may include support of communications sessions and sharing.

The communication device 100 may additionally include memory for use in connection with the execution of programming by the processor, and for temporary or long term storage of program instructions and/or data. As examples, the memory may comprise RAM, SDRAM, or other solid state memory. Alternatively or in addition, data storage may be provided. In accordance with embodiments, data storage can contain program instructions or code implementing various of the applications executed by the communication device, and data that is used and/or generated in connection with the execution of applications. Like the memory, the data storage may comprise a solid state memory device. Alternatively or in addition, the data storage may comprise a hard disk drive or other random access memory. In accordance with still other embodiments, the memory may provide random access storage, while some or all of the data storage may comprise read only storage.

Examples of application programming or instructions that can be stored in data storage include a telephony application(s). A communication device may also include an email application, or other communication application. In accordance with still other embodiments, the data storage of a communication device may store a number of other applications. Examples of such other applications include word processing, spreadsheet, presentation, drawing, multimedia presentation, calendar, or other applications. Moreover, an application can comprise a stand-alone application, or the client portion of a client-server application that cooperates with the server as the server host. At least some of the applications are operable to display content on the communications device on an associated display. Moreover, the memory and/or data storage may provide a data store for example for storing content displayed and/or used by an application, and storage for operating system software.

The communication device 100 can also generally include one or more user input devices, such as a alpha/numeric keypad. Examples of user input devices include a touch screen display, a keyboard, a pointing device combined with a display screen or other position encoder, a microphone or other audible input device, and a keypad. In addition, a communication device can generally include one or more user output devices. Examples of user output devices include a display, an audio output device, and indicator lamps. The communication device 100 may also generally include one or more communication network interfaces. Examples of communication network interfaces that may be provided as part of the communication device 100 include a packet data network interface, such as a wired or wireless Ethernet interface or cellular packet data interface, a telephony network interface, and/or other wireless or wire line interfaces.

FIG. 1 illustrates an exemplary communications environment. The communications environment includes communications device 100 that is connected via communications network 10 and one or more links 5, to one or more other phones or communications devices, such as communications device 200. The communications device 100, in addition to well known and common componentry, includes switch 110, A-to-D converter 120, detection module 130, controller/processor 140 and memory 150. In addition, the communications device 100 is connected to a handset, such as handset 102 that includes narrow-band microphone 104, wide-band microphone 106 and optional mechanical filter 50 and associated selection device, such as lever, 52.

While the embodiments described herein will be discussed in relation to a communications device, such as a desktop phone, it should appreciated that the techniques can be extended to any type of phone and/or microphone and is not limited to the desktop phone illustrated in FIG. 1. As an example, the multi-microphone setup can be used in one or more of a phone, telephone, cell phone, smartphone, microphone associated with a soft phone, and in general, can be used for any microphone-type device where bandpass filtering is desired.

While the embodiment illustrated in FIG. 1 illustrates some components associated with the communications device 100 and some components associated with the handset 102, it should be appreciated that this is merely an exemplary configuration, and the components described herein can be placed at any location within the system without affecting the operation thereof. For example the switch 110 and A-to-D converter 120 could be placed in the handset 102. Other placements and configurations will be readily apparent.

As discussed above, one exemplary aspect is directed toward a phone that is able to switch back-and-forth between narrow-band digital audio encoding in which the A-to-D converter 120 samples the audio stream 8,000 times per second and wide-band audio encoding in which the A-to-D converter 120 samples the audio stream at 16,000 times per second.

In accordance with a first exemplary embodiment, the handset 102 includes a narrow-band microphone 104 and a wide-band microphone 106. Each of these microphones is optimized for a specific frequency range and, for example, where the communications device 100 is designed to support G.711 and G.722, the narrow-band microphone 104 can be configured to operate in the frequency range below 4,000 Hz and the wide-band microphone 106 configure to operate below 8,000 Hz.

Thus, the narrow-band microphone 104 is utilized for input to a narrow-band encoder and the second, wide-band microphone 106, used for input to a wide-band encoder. As will be appreciated, the number of microphones can be increased as the number of bandpass filtering requirements increases. Thus, the handset 102 can include a plurality of microphones, with each microphone optimized for a specific frequency range or band.

In accordance with another exemplary embodiment, the handset 102 can be equipped with a mechanical filter 50 and corresponding actuator 52, such as a manual and/or electro-mechanical actuator. The mechanical filter 50, once actuated by actuator 52, can mechanically filter sounds going to a single microphone, thereby possibly eliminating the need for multiple microphones, and allowing a single microphone to act as both a narrow-band microphone and a wide-band microphone, depending on the placement of the filter 50. As will be appreciated, the filter 50 can be manually activated by a user, and/or alternatively activated by an actuator, that can include a motorized element thereby allowing the filter to be associated with the microphone, and removed therefrom.

In operation, the communications device 100 is capable of operating in two different modes: a narrow-band mode and a wide-band mode. Depending on one or more of the conditions discussed hereinafter, these modes can be selected to support the underlying communications protocol. In accordance with a first exemplary embodiment, a handshake is detected between the communications device 100 and communications device 200 with the cooperation of detection module 130. In general, this handshake can be any type of handshake including a SIP handshake, or handshake that includes information such as a request to operate in a narrow-band mode or a wide-band mode. This handshake or other request to establish a communications session between the communications device 100 and the communications device 200 can also generally include information as to what type of audio encoding will be used to support the underlying communication, with this information being detectable by the detection module 130 that can in turn be used to determine whether the phone is to operate in the narrow-band mode or the wide-band mode.

In accordance with another exemplary embodiment, the communications device 100, again cooperating with the detection module 130, is able to detect the capabilities of one or more of far-end equipment, such as communications device 200, as well as communications network 10 and link(s) 5. In a similar manner, and depending on the discovered equipment capabilities, the communications device 100 can operate in either the narrow-band mode or the wide-band mode.

In accordance with yet another exemplary embodiment, channel conditions, such as the conditions in communications network 10 and/or link 5 can be detected, with the detection module 130 cooperating with the controller/processor 140 to setup the phone to operate in a particular mode based thereon. For example, in noisy channel conditions or other conditions in which wide-band protocols may not be supported, the detection module 130, cooperating with the controller/processor 140 can force the communications device 100 to operate in a narrow-band mode, therefore selecting the narrow-band microphone 104 as discussed hereinafter.

Once a determination is made as to whether narrow-band or wide-band audio encoding is required, the detection module 130, cooperating with switch 110 selects the appropriate microphone. For example, if the communications device 100 is to operate in a narrow-band mode, the switch 110 selects the input from narrow-band microphone 104 to be sent to the A-to-D converter 120. If the communications device 110 is to operate in a wide-band mode, the switch 110 directs the input from the wide-band microphone 106 to the A-to-D converter 120. As discussed in accordance with an exemplary, non-limiting embodiment, the A-to-D converter 120 samples the audio stream from the narrow-band microphone 104 at 8000 times per second, and samples the audio stream from the wide-band microphone 106 at 16,000 times per second. Since the narrow-band microphone 104 in accordance with one exemplary embodiment fails to capture sounds above 4,000 Hz, and the wide-band microphone 106 fails to capture sounds above 8,000 Hz, the communications device 100 is able to support more than one A-to-D conversion rate while still avoiding aliasing problems.

Figure 2:
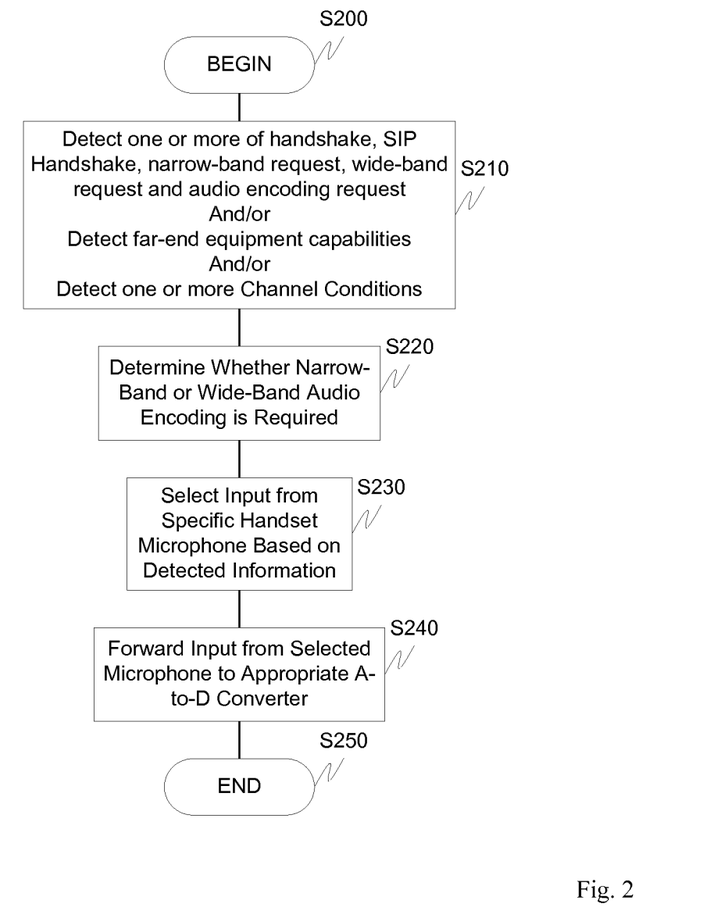
FIG. 2 is a flowchart illustrating an exemplary method of selecting a microphone.

FIG. 2 outlines an exemplary method of operation of a communications device. In particular, control begins in step S200 and continues to step S210. In step S210, one or more of a handshake, SIP handshake, narrow-band request, wide-band request and an audio encoding request are detected. Alternatively, or in addition, one or more of far-end equipment capabilities and channel conditions can also be detecting. Next, in step S220, and based on one or more of the above-detected capabilities, conditions, and information, a determination is made as to whether narrow-band or wide-band audio encoding is going to be required to support the underlying communication. Then, in step S230, a specific microphone is selected based on the determination as to whether the narrow-band or wide-band audio encoding is required. Control then continues to step S240.

In step S240, the input from the selected microphone is forwarded to an appropriate A-to-D converter. Control then continues to step S250 where the control sequence ends.

As discussed, the handset 102 can be equipped with a mechanical filter 50 and corresponding actuator 52, such as a manual and/or electro-mechanical actuator. Alternatively, or in addition, the resonant characteristics of the handset's microphone chamber 53 can also be altered, for example by actuator 52 adjusting one or more of a volume, size, shape and reflectivity of the microphone chamber. This configuration will also allow the possibly of eliminating the need for multiple microphones, and therefore allow a single microphone to act as both a narrow-band microphone and a wide-band microphone, depending on the resonant characteristics of the chamber. As will be appreciated, the mechanism to adjust the resonant characteristics of the chamber can be manually activated by a user, and/or alternatively activated by an actuator, that can include a motorized device, such as a solenoid.

Alternatively, or in addition, the communications device 100 can be equipped with a special mode that allows the user to select which microphone setting sounds best. For example, communications devices include a side-tone circuit that allows a user to hear what they are saying in the earpiece. The communications device could have a special mode, that when taken off-hook, allows the user to speak into the microphone(s) and one or more of select a microphone, manipulate the filter and/or alter the resonant characteristics of the chamber, with the user being able to detect which adjustment(s) make their voice sound the best since their voice could be heard in the ear-piece because of the side-tone circuit.

Figure 3:
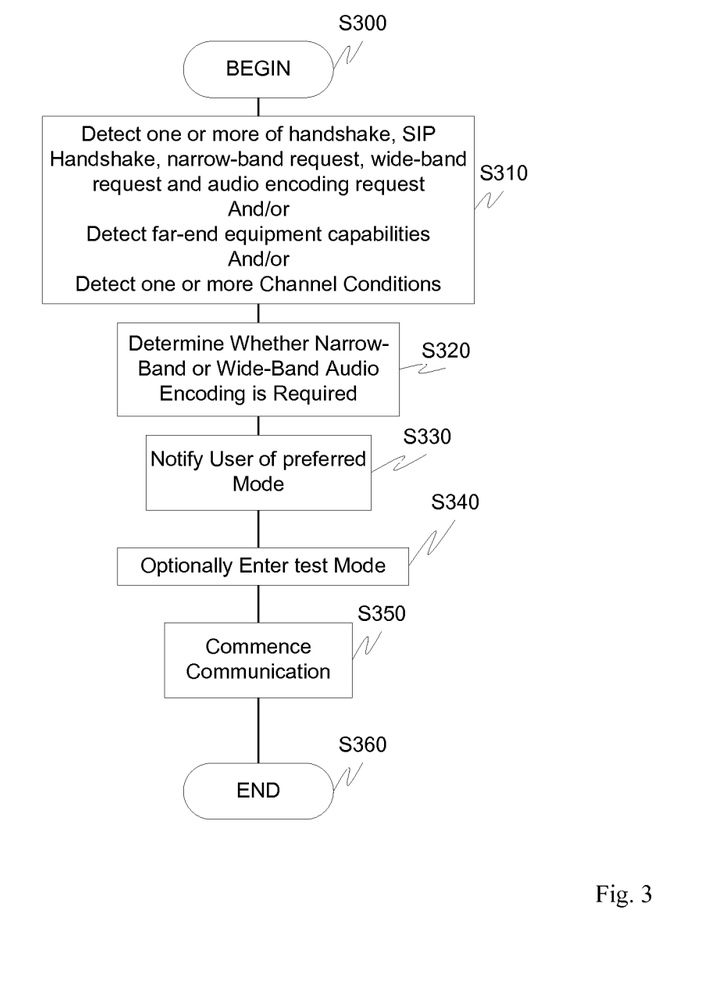
FIG. 3 is a flowchart illustrating an exemplary method of selecting a microphone or microphone characteristics.

FIG. 3 outlines an exemplary method of operating a communications device. In particular, control begins in step S300 and continues to step S310. In step S310, one or more of a handshake, SIP handshake, narrow-band request, wide-band request and an audio encoding request are detected. Alternatively, or in addition, one or more of far-end equipment capabilities and channel conditions can also be detecting. Next, in step S320, and based on one or more of the above-detected capabilities, conditions, and information, a determination is made as to whether narrow-band or wide-band audio encoding is going to be required to support the underlying communication. Control then continues to step S340.

In step S340, the user is notified of the preferred operation mode of the communications device, e.g., narrow-band or wide-band. This indication can be, for example, via a display, LED, audibly, or in general via any means that notifies the user of one or more of the preferred operation mode and a preferred setting of the filter and/or actuator for adjusting the resonant characteristics of the microphone chamber. Next, and optionally in step S340, the communications device can optionally enter a test mode where a user can test the various settings to determine which sounds the best. Control then continues to step S350 where communications commence with control continuing to step S360 where the control sequence ends.

The exemplary systems and methods have been described in relation to a telecommunication system. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a communication server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the embodiments are not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present description.

The various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method of selecting a bandpass filtering technique for a device that supports more than one analog to digital conversion rate comprising:
   detecting information indicative of whether wide-band or narrow-band encoding is required to support an underlying telephony communication; and
   selecting a specific microphone from a plurality of microphones comprising a wide-band microphone and a narrow-band microphone, based on the detecting step, and wherein the wide-band microphone is selected as the specific microphone upon the detecting step indicating wide-band encoding is required and the narrow-band microphone is selected as the specific microphone upon the detecting step indicating narrow-band encoding is required.

2. The method of claim 1, further comprising forwarding input from the selected specific microphone to an analog to digital converter.

3. The method of claim 1, further comprising engaging a switch to select the specific microphone from the plurality of microphones.

4. The method of claim 1, wherein the information is one or more of a handshake, a SIP handshake, a narrow-band request, a wide-band request and an audio encoding request.

5. The method of claim 1, wherein the detecting step comprises detecting far-end equipment capabilities.

6. The method of claim 1, wherein the detecting step further comprising detecting one or more channel conditions.

7. The method of claim 1, wherein the device is a communications device.

8. The method of claim 1, wherein the device is a phone.

9. The method of claim 1, wherein the device is a microphone.

10. A system for selecting a bandpass filtering technique for a device that supports more than one analog to digital conversion rate comprising:
    means for detecting information indicative of whether wide-band or narrow-band encoding is required to support the underlying telephony communication; and
    means for selecting a specific microphone from a plurality of microphones comprising a wide-band microphone and a narrow-band microphone, based on the detecting step, and wherein the wide-band microphone is selected as the specific microphone upon the detecting means indicating wide-band encoding is required and the narrow-band microphone is selected as the specific microphone upon the detecting means indicating narrow-band encoding is required.

11. A system that selects a bandpass filtering technique for a device that supports more than one analog to digital conversion rate comprising:
   a detection module that detects information indicative of whether wide-band or narrow-band encoding is required to support the underlying telephony communication; and
   a switch that selects a specific microphone from a plurality of microphones comprising a wide-band microphone and a narrow band microphone based on the detecting step, and wherein the wide-band microphone is selected as the specific microphone upon the detecting module detecting wide-band encoding is required and the narrow-band microphone is selected as the specific microphone upon the detecting module detecting narrow-band encoding is required.

12. The system of claim 11, wherein input from the selected specific microphone is forwarded to an analog to digital converter.

13. The system of claim 11, further comprising a switch that selects the specific microphone from a plurality of wide-band microphones and a plurality of narrow-band microphones.

14. The system of claim 11, wherein the information is one or more of a handshake, a SIP handshake, a narrow-band request, a wide-band request and an audio encoding request.

15. The system of claim 11, wherein the detection module further detects far-end equipment capabilities.

16. The system of claim 11, wherein the detection module further detects one or more channel conditions.

17. The system of claim 11, wherein the device is a communications device.

18. The system of claim 11, wherein the device is a phone.

19. The system of claim 11, wherein the device is a microphone.

20. The system of claim 11, wherein the switch is operable to select the specific microphone further comprises the switch being further operable to select a plurality of specific microphones selected from a first plurality of narrow-band microphones and a second plurality of wide-band microphones.

* * * * *